Feb. 7, 1967   R. W. CASTLEBERRY   3,302,342
AWNING SYSTEM FOR MOBILE HOMES
Filed Feb. 1, 1965   3 Sheets-Sheet 1
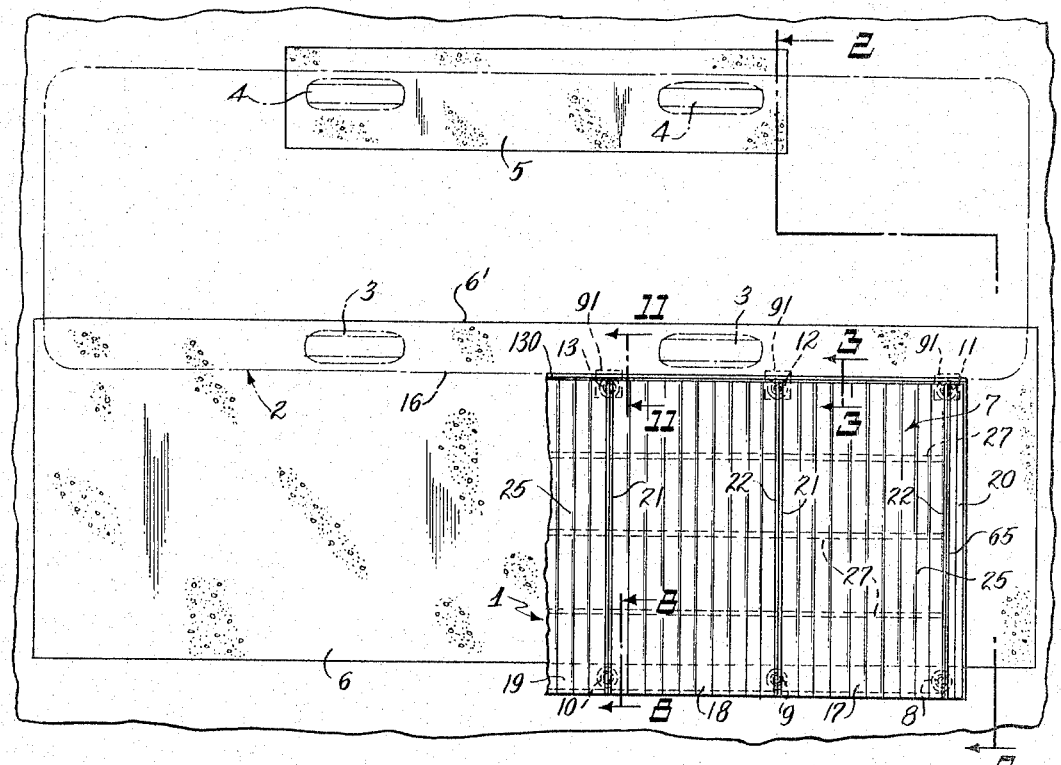
Fig. 1.
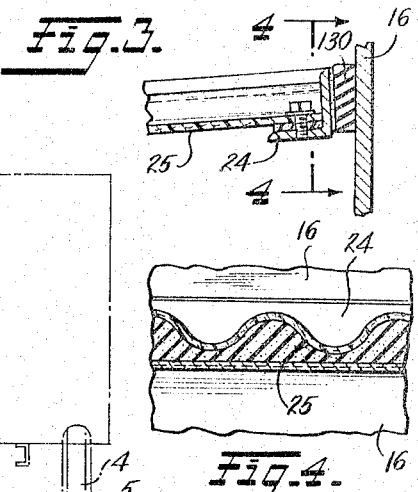
Fig. 3.
Fig. 4.
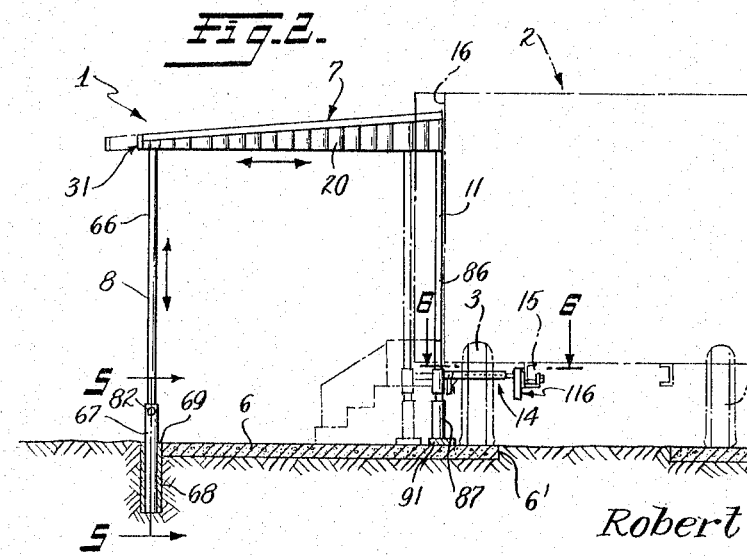
Fig. 2.
INVENTOR
Robert W. Castleberry
BY
Arnold & Roylance
ATTORNEYS Feb. 7, 1967
R. W. CASTLEBERRY
3,302,342
AWNING SYSTEM FOR MOBILE HOMES
Filed Feb. 1, 1965
3 Sheets-Sheet 2
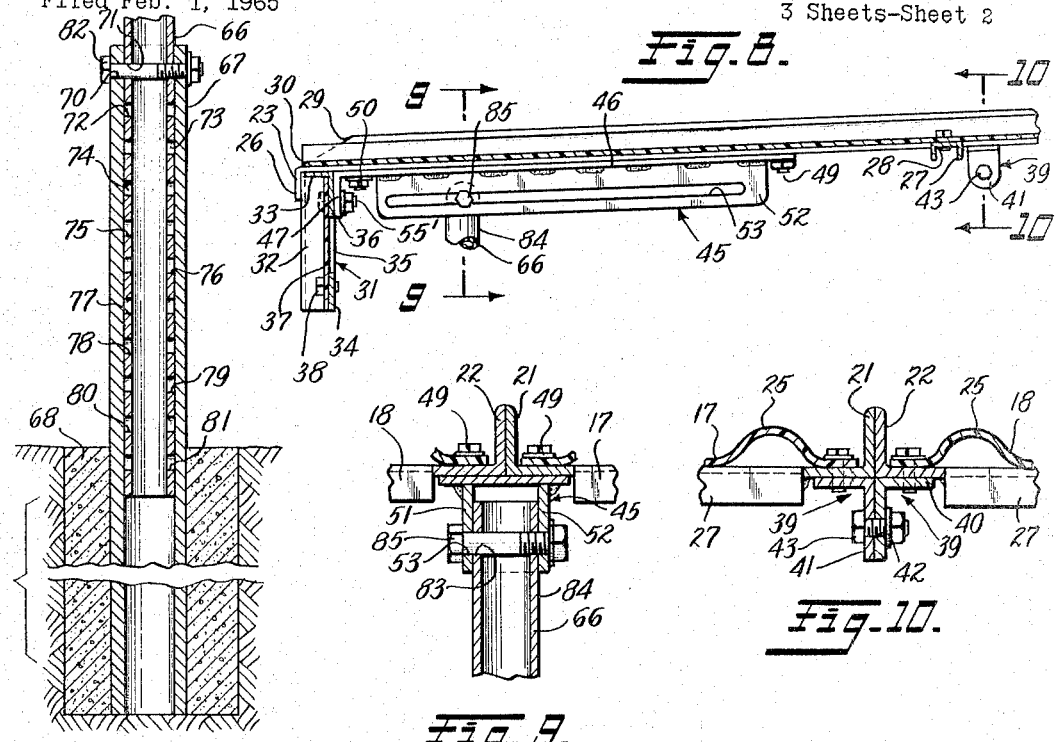
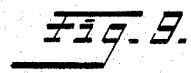
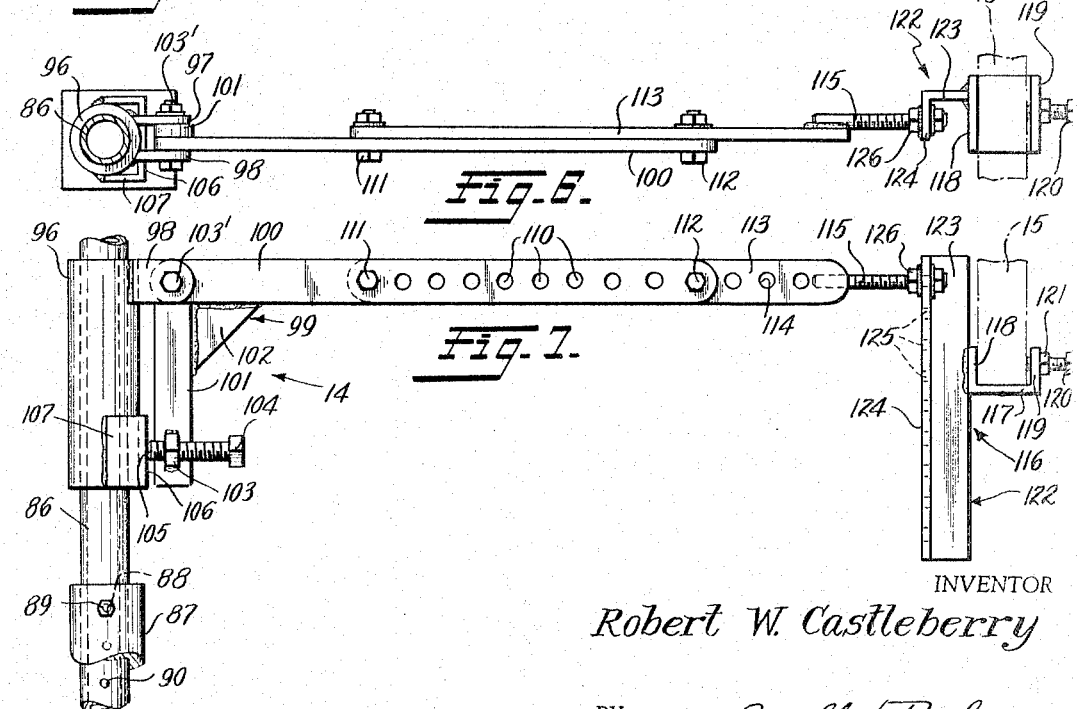
INVENTOR
Robert W. Castleberry
BY Arnold & Raylance
ATTORNEYS

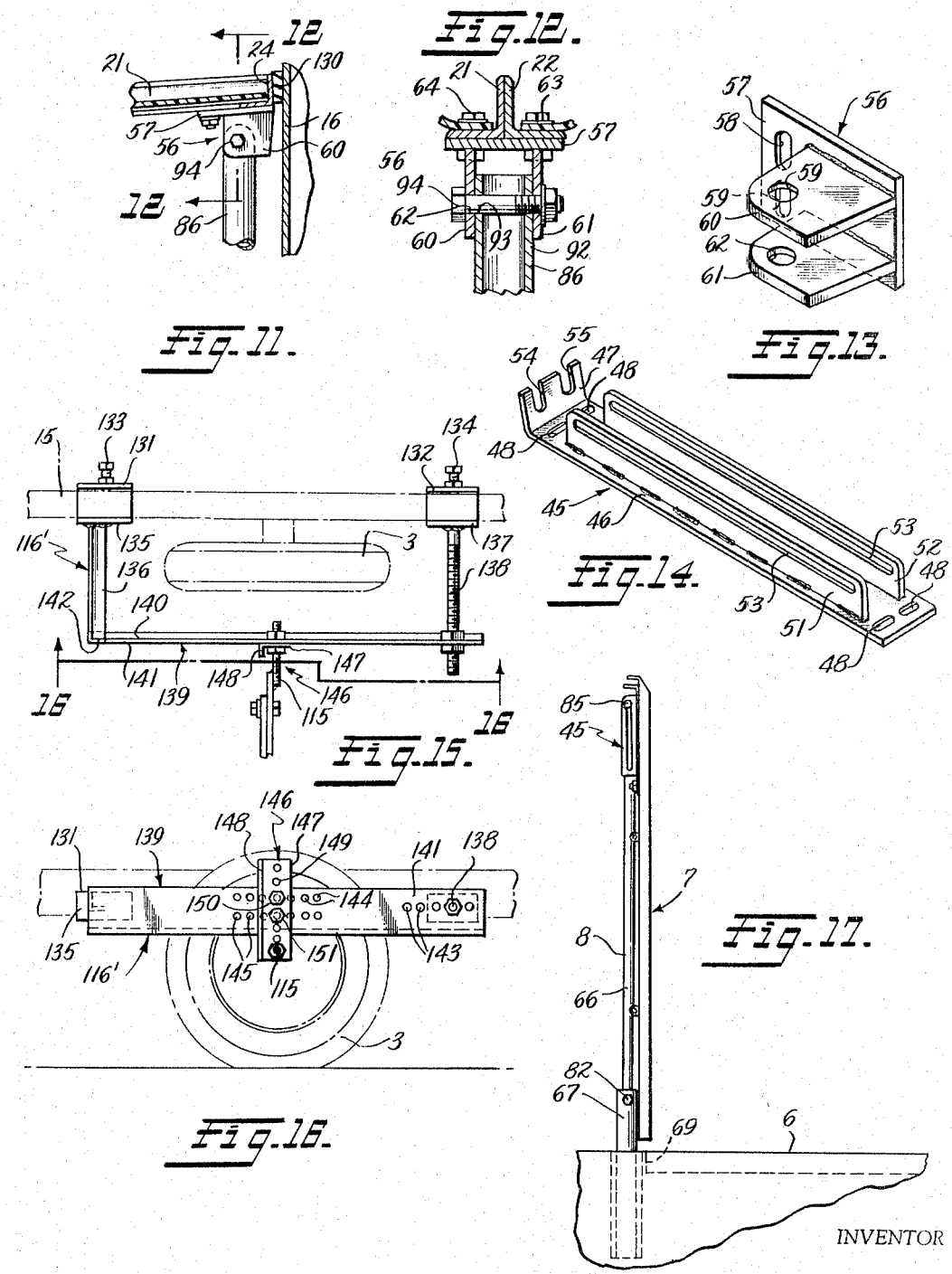

United States Patent Office 3,302,342
Patented Feb. 7, 1967

3,302,342
AWNING SYSTEM FOR MOBILE HOMES
Robert W. Castleberry, 101 Mobilhomsted Drive,
Amarillo, Tex. 79107
Feb. 1, 1965, Ser. No. 429,476
19 Claims. (Cl. 52—90)

This invention relates generally to awning systems and particularly to adjustable awning systems for mobile homes, such as the commonly known house trailer.

Although mobile homes of the house trailer type have many advantages because of their ease of transportation, the primary disadvantage of such mobile homes is limited living space. Manufacturers of trailers recognize this problem and have attempted to solve same by manufacturing trailers having wall sections that can be extended to provide additional space for living quarters, and can be retracted to provide a trailer of sufficiently small dimensions to permit highway travel. Such movable sections include pivotal and slidable roof members which may be used as patio covers. However, a disadvantage of such units carried by the trailer is the increased weight and substantially higher original cost of the mobile home.

With the normal trailer, without expensive refinements, the occupants of the trailer are frequently deprived of a patio and outside living space such as a screened porch which is available to home owners. Recently, the owners of trailer parks have recognized this problem and have provided grass or concrete patios adjacent the parking site for the mobile homes which utilize the facilities of the park.

Applicant's invention relates to a foldable awning system for mobile homes, and although particularly adapted for mobile homes which use the facilities of a trailer park, applicant's invention, of course, can be utilized wherever the owner of the mobile home may park same for a length of time sufficient to justify the expense. With applicant's invention an awning in the form of a patio roof can be quickly and efficiently connected to any size and model of mobile home without the need for defacing the exterior of the mobile home by drilling holes or using special connections or attachments which must be secured to exposed surfaces of the mobile home. Since the awning of this invention is extremely strong and durable it is particularly adapted for use in southern coastal states where high winds due to hurricanes and other weather peculiarities frequently occur.

One advantage of the awning system is the ability to fold the awning system to a non-use position where it can function as a screen to isolate a portion of the patio from view from an adjacent trailer. If necessary, during hurricane weather, the awning may be folded and secured to positively prevent damage thereto, and is easily erected after the storm is over.

Accordingly, an object of this invention is an awning system particularly adapted for use with mobile homes.

Another object is an awning system which can be permanently installed at a predetermined location and is adapted to fit any mobile home regardless of size or construction.

A further object is an adjustable awning system particularly useful as a patio cover which is portable, and is adapted to be connected to a mobile home of any model or make parked in a predetermined position relative to a permanent support for the awning system.

A further object is an awning system connectable to a mobile home in such a manner that it is unnecessary to drill or otherwise deface a mobile home to effect a rigid, sturdy connection.

Another object is an awning system for a mobile home which is adjustable to fit any type mobile home and is connectable to the chassis of the mobile home to secure the awning.

Another and further object is an awning system for a mobile home which provides an effective seal between one side of the awning and a wall portion of the mobile home to prevent leakage of water therebetween without the need of drilling or otherwise defacing the mobile home.

Another and still further object is an awning system of the type described which is inexpensive to manufacture, easy to adjust and connect to any size mobile home, and which requires a minimum time to install adjacent the patio for a mobile home parked in an approximate predetermined location.

Numerous other advantages and objects will become apparent from the accompanying drawings which form a part of the specification and wherein:

FIG. 1 is a fragmentary top plan view showing the awning system of this invention;

FIG. 2 is a vertical sectional view taken along line 2—2 of FIG. 1, and illustrating the manner in which the awning system is adapted to mobile homes of various width;

FIG. 3 is an enlarged fragmentary vertical sectional view taken along line 3—3 of FIG. 1 and illustrating the seal between the side wall of the mobile home and the adjacent side of the roof of the awning system;

FIG. 4 is a partial view in transverse section taken along line 4—4 of FIG. 3;

FIG. 5 is an enlarged fragmentary vertical sectional view taken along line 5—5 of FIG. 2 and illustrating the details of an adjustable connection for the front supports of the awning system;

FIG. 6 is an enlarged fragmentary sectional view taken on line 6—6 of FIG. 2 and illustrating the details of a mounting bracket assembly;

FIG. 7 is a fragmentary view in side elevation of the mounting bracket assembly of FIG. 6;

FIG. 8 is an enlarged fragmentary view in vertical section taken on line 8—8 of FIG. 1 and illustrating the details of an adjustable connecting member;

FIG. 9 is an enlarged fragmentary view in vertical section taken on line 9—9 of FIG. 8;

FIG. 10 is an enlarged fragmentary view in vertical section taken on line 10—10 of FIG. 8;

FIG. 11 is an enlarged fragmentary view in vertical section through a rear support bracket, taken on line 11—11 of FIG. 1;

FIG. 12 is a fragmentary view in vertical section taken on line 12—12 of FIG. 11;

FIG. 13 is a side view in perspective of a rear support bracket member;

FIG. 14 is a bottom perspective view of a front support bracket member;

FIG. 15 is a top plan view of a modified mounting bracket for connecting the awning system to a vehicle chassis where a wheel interferes with a standard chassis connecting bracket of the type shown in FIGS. 6 and 7;

FIG. 16 is a front elevational view of the modified mounting bracket taken on line 16—16 of FIG. 15; and FIG. 17 is a side elevational view of the awning system in a folded position.

Referring now to the drawings in detail and particularly to FIGS. 1 and 2 there is shown an awning system 1, in accordance with this invention, a mobile home 2 having wheels 3 at one side thereof, and wheels 4 at the other side thereof. The mobile home is parked at a site provided with a narrow elongate concrete supporting slab 5 on which wheels 4 rest, and a relatively wide concrete slab 6 coplanar with slab 5, spaced horizontally therefrom, and on which wheels 3 of the mobile home rest adjacent an edge 6' of slab 6. Slabs 5 and 6 provide a relatively firm foundation for parking of the mobile home and also provide a support for jacks or other structures conventionally used to elevate the mobile home to remove the load of same from the springs and tires thereof.

Awning system 1 includes a roof structure 7, a plurality of front supports 8–10, a plurality of rear supports 11–13, and a plurality of mounting bracket assemblies 14, connected between each of the rear support members 11–13 and a frame member 15 of the chassis of the mobile home. As best seen in FIGS. 1 and 2 roof structure 7 slopes slightly downwardly in a direction away from mobile home 2, and is supported at one side by front supports 8, and at the other side by rear supports 11, rear supports 11–13 extending adjacent to and parallel with a side wall 16 of mobile home 2.

Roof structure 7 is made up of a plurality of identical fabricated roof sections 17–19, and two end sections 20, only the right hand one of which is shown in FIGS. 1 and 2. Each of roof sections 17–19 is fabricated and includes a frame having a pair of angle iron side members 21 and 22, and angle iron front and rear members 23 and 24. As best seen in FIGS. 1 and 10 side members 21 and 22 of each section have one leg of the angle iron extending generally horizontally toward each other and the other leg extending vertically upwardly to provide a frame to receive a corrugated roof panel 25 which is preferably of plastic material. Rear frame member 24 is also an angle iron having its horizontal leg coplanar with and facing the horizontal legs of side members 21 and 22 and its vertical leg extending generally upwardly. Rear member 24 is preferably attached to the ends of side members 21 and 22 by welding. Front member 23 has its horizontal leg coplanar with the horizontal legs of side members 21 and 22 and has its ends secured to the side members. However, the vertical leg 26 of front member 23 extends downwardly as best seen in FIG. 8, otherwise a channel would be formed which could prevent proper draining of water from adjacent the front edge of the roof section. Extending between side members 21 and 22 and welded to the undersurface of the horizontally disposed legs thereof are three equidistantly spaced inverted U-shaped channel members 27 which function to rigidify the roof frame. As shown in FIG. 8 the center flat portion 28 of channel 27 engages the undersurface of the horizontal leg of side members 21 and 22. As also shown in FIG. 8 the front end of each side member 21 and 22 is cut at an angle as at 29 to taper the front end.

Secured to the front end 30 of each of roof sections 17–19 is a front shroud section 31 having vertical angle iron side members 32, as best shown in FIG. 8, angle iron top member 33, and a strap iron bottom brace 34. Rear leg 35 of each side member 32 is secured to vertical leg 36 of top member 33. Bottom brace 34 extends between the lower ends of the legs 35 of side members 32. A relatively short section of panel material 37 of plastic having its corrugations extending vertically is secured to the front section frame with threaded fasteners 38.

Fixed to the horizontal leg of each of side members 21, 22 are several L-shaped intermediate connectors 39 having a horizontal leg 40 welded to the bottom of the horizontal leg of a side member, and a vertical leg 41 extending downwardly coplanar with the vertical leg of the side members. The connectors 39 for each of the roof sections 17–19 are arranged in aligned relation so that openings 42 therein are aligned when a pair of roof sections are placed in side-by-side relation, whereupon a bolt 43 may be inserted through opening 42 to fasten the roof sections together.

The front end of each roof section is connected to the adjacent roof section by a front connector bracket 45 as best seen in FIGS. 8, 9 and 14. Front connector bracket 45 has a horizontal top plate 46 with its front end bent generally downwardly to provide a nose plate 47. Top plate 46 has four openings 48 formed therein to receive bolts for fastening adjacent sections together. Openings 48 are transversely elongated to facilitate inserting appropriate fasteners even though there is a slight transverse mismatch in the adjacent roof sections. As best seen in FIGS. 8 and 9 top plate 46 lies against and hence supports the horizontal legs of side members 21 and 22. Top plate 46 is secured to the horizontal legs of side members 21, 22 with bolts 49 and 50 extending through the respective openings, it being understood that suitable openings to receive the bolts are also provided in the horizontal legs of the abutting side members. Projecting downwardly from the top plate 46 in spaced apart relation are a pair of parallel elongated vertical legs 51 and 52 each having an elongated longitudinally extending slot 53, the purpose of which will subsequently be described in detail. Nose plate 47 is provided with open ended slots 54 and 55 to receive bolts 55′ for connecting front shroud sections 31 to front end 30 of each roof section.

The rear ends of each roof section are connected together with a rear connector bracket 56 as best shown in FIGS. 11–13. Rear connector bracket 56 has a top plate 57 with a pair of transversely aligned elongated slots 58 and 59. Projecting downwardly from top plate 57 are a pair of side legs 60 and 61 in spaced apart parallel relation, the legs having aligned openings 62 to receive a bolt. As shown in FIG. 11 rear connector bracket 56 is disposed adjacent the rear end of the roof section. The projecting portion of top plate 57 wherein slots 58 and 59 are located extends forwardly toward the front of the roof section. As shown in FIG. 12 top plate 57 extends beneath the horizontal legs of side members 21 and 22 of a pair of abutting roof sections, and rear connector bracket 56 is secured to the side members with bolts 63 and 64 extending through suitable openings in the horizontal legs of side members 21, 22 and through openings 58 and 59 in top plate 57, this arrangement serving to rigidly connect the rear ends of adjacent roof sections.

End section 20 is constructed in a manner quite similar to front section 31 save that it also includes a side member 65 in the form of an angle having one leg horizontal and the other leg projecting vertically upwardly. This side member 65 is substantially identical to side member 21 where the end member is used at the right hand end of the awning assembly as shown in FIG. 1. Where an end section 20 is used at the left hand end (not shown) of the awning system it is to be understood that the left hand end section is the mirror image of the right hand end section. As shown in FIG. 2, end 20 tapers convergingly in a direction away from mobile home 2. Because of the arrangement of member 65 of end section 20 the end section can be attached to the side member 22 of any roof section in the same manner as connecting adjacent roof sections together.

Each of front support members 8–10 is comprised of an upper support section 66 in the form of an elongated pipe of uniform diameter, and a lower support section 67 in the form of a pipe substantially shorter than section 66. Lower support section 67 is embedded in concrete 68 and extends vertically from a location adjacent to edge 69 (FIG. 2) of patio slab 6. Lower support section 67 has an inside diameter of sufficient size to slidingly receive the lower end of upper section 66 therein as shown in FIG. 5. Both upper section 66 and lower section 67 are disposed substantially vertically as best seen in FIGS. 2 and 5. Adjacent its exposed upper end, lower support section 67 is provided with a diametrically extending bore 70. Adjacent its lower end, upper section 66 is provided with a plurality of vertically spaced apart diametrically extending bores 71–81, the axis of each bore lying in the same vertical plane. Bore 70 and bores 71–81 are all of essentially the same diameter to receive a nut and bolt assembly 82 for securing the lower section to the upper section. Referring now to FIG. 9, a diametrically extending bore 83 is provided adjacent upper end 84 of upper section 66. Bore 83 is provided to permit connecting upper end 84 of upper section 66 to front bracket 45 with a bolt 85 passed through bore 83 and each of slots 53 of the front bracket. To assure alignment of bore 70, with bores 71–81, and bore 83, the bores are formed so that each of their axes is in the same vertical plane defined by the axes of front supports 8–10.

Each of rear supports 11–13 is comprised of an upper section 86 (FIG. 12) in the form of a pipe which is slidingly received within a lower section 87 which is a short length of pipe. The lower section is provided with a diametrically extending bore 88 (FIG. 7) to receive a bolt 89 whereas the lower portion of the upper section has diametrically extending bores 90 in spaced apart relation to permit adjusting the vertical height of each of the rear supports by inserting bolt 89 through bore 88 and the appropriate one of bores 90. Connected to the bottom end of lower section 87 is a flat bearing 91 (FIG. 2) which rests on the flat upper surface of concrete slab 6. The connection between bearing plate 91 and lower section 87 is preferably accomplished by welding. An upper end 92 (FIGS. 11 and 12) of upper section 86 is provided with a diametrically extending bore 93 to receive a bolt 94 which extends through the bore as well as through openings 62 of connector bracket 56 to connect a rear support to the rear of roof section 17. To insure alignment of bore 89 with bore 90, and with bore 93, the axes of all these bores lie in a vertical plane which passes through the axes of all the vertical rear supports 11–13. This arrangement also insures alignment of openings 62 of connector bracket 56 with bore 93.

A mounting bracket 14 (FIGS. 6 and 7) is connected to the lower end of each of upper sections 86 of rear supports 11–13. The connection is accomplished by a sleeve 96 of suitable inside diameter to be slidingly received on upper section 86 adjacent the top end of lower section 87. Connected to the upper end of sleeve 96 as by welding are a pair of spaced apart ears 97 and 98 which form a yoke to receive bell crank 99 comprised of horizontal link 100 and vertical link 101 fixed together by a gusset plate 102. The ends of links 100 and 101 which overlap are provided with a bore to receive a bolt 103' to pivotally connect bell crank 99 to ears 97, 98 of sleeve 96. Extending laterally from the lower end of link 101 is a lug 103 which is internally threaded to receive a bolt 104. End 105 of the bolt engages flat surface 106 of a C-shaped channel member 107 secured to the lower end of sleeve 96 by welding.

Link 100 is provided with a plurality of spaced apart drilled openings 110 through which bolts 111 and 112 may be inserted to connect link 110 to a link 113 with their side faces in engagement, link 113 having drilled openings 114 of the same diameter and distance between centers as openings 110. Welded to the end of link 113 remote from link 100 is a threaded stud 115 which is connected to a chassis mounting bracket assembly 116.

A chassis mounting bracket indicated generally at 116 is fabricated from a short length of C-shaped channel 117 having side legs 118 and 119 which extend on both sides of chassis frame member 15 of mobile home 2, as best seen in FIGS. 2 and 7. Leg 119 is provided with a threaded bore to receive a bolt 120 that carries a nut 121 to lock the bolt after it is tightened. Welded to the outer face of leg 118 is an angle iron member 122 which is elongated in a vertical direction. It is to be noted that angle 122 is welded along the edge of a leg 123 disposed generally parallel with links 100 and 113 and that a leg 124 lies in a plane perpendicular to the axis of stud 115. Leg 124 is provided with a plurality of vertically spaced apart openings 125 through any of which stud 115 may be inserted.

It is to be noted that mounting bracket 14 is adjustable relative to the one of rear supports 11–13 on which it is mounted; is vertically adjustable by inserting stud 115 into a desired one of openings 125; and is horizontally adjustable by connecting links 100 and 113 together via bolts in selected ones of holes 114 and 110 and by adjusting nut 126 on stud 115. It is also to be noted that a rigid bell crank is provided by links 101, 100, 113 and stud 115. Hence, upon rotation of bolt 104 in a clockwise direction (assuming the bolt has right hand threads), sleeve 96, and the rear support to which it is connected are pivoted in a clockwise direction about the axis of bolt 103'. Although sleeve 96 is free to slide on upper section 86 of the rear support, the end result of turning bolt 104 in a clockwise direction, into engagement with face 106 is to pull the upper end of the rear support more closely against side wall 16 of mobile home 2. Correspondingly, bearing plate 91 will move slightly away from the mobile home during such manipulation of bolt 104. However, the entire weight of the rear portion of the roof assembly will still be supported by bearing plates 91 at the bottom of rear support 17–19 of the awning system.

Due to the construction of the various portions of the awning systems both assembly and installation at the desired site can be easily accomplished in the following manner. First, the desired number of roof sections, like section 17 are connected together in side-by-side relation to form a roof structure 7 of sufficient length to cover the desired patio area, or other area where a roof section is desired. In practice, each of roof sections 17–19 is identical, and measures approximately five feet between side members 21 and 22, and approximately 10 feet between front member 23 and rear member 24. Hence, if it is desired to construct an awning twenty feet long it is merely necessary to connect four roof sections like sections 17–19 together in side-by-side relation. Connecting roof sections like 17–19 together is best accomplished by laying the sections upside down on a flat surface in side-by-side relation. Bolts 43 (FIG. 10) are then passed through openings 42 of intermediate connectors 39 and nuts are tightened on the bolts.

Next, a rear connector bracket 56 is placed across the horizontal legs of abutting side members 21, 22 in the position shown in FIG. 12, and bolts 63 and 64 are inserted through openings 58 and 59 to secure the rear connector bracket to each of adjacent roof sections like sections 17, 18 of FIG. 1. Similarly the front end of adjacent sections is secured together with a front bracket 45 by positioning the front bracket at the proper position across the horizontal legs of side members 21 and 22 (FIG. 9) and securing front bracket 45 to the side members with bolts 49 and 50 as shown in FIGS. 8 and 9.

The number of front brackets 45 required is one more than the number of connected roof sections, and the number of rear connector brackets 56 is likewise one more than the number of connected roof sections, because one of each bracket is required between each adjacent roof section as well as at the free side of the sections at each end of the roof structure, for example at side member 22 of roof section 17.

A front shroud section 31 is then connected to the front end of each of the roof sections. This is easily accomplished with bolts 55' that extend through top member 33 of the front shroud through one of slots 54, 55 whereupon tightening of the bolt secures the front shroud 31 to the roof section. It is to be noted that as many front shroud sections 31 are required as there are roof sections 17–19.

The preassembled end sections 20 are then secured to the outer side edges of the outermost roof sections of the assembly. Such securing is accomplished in a manner identical to the joining of two adjacent roof sections, the connection including intermediate connectors 39, a front bracket 45, and a rear connector bracket 56.

In addition to connecting adjacent roof sections together connector brackets 45 and 56 are connected to the upper ends of front supports 8–10, and rear supports 11–13, respectively. Connecting the upper end 84 of upper section 66 of a front support is accomplished by passing bolt 85 through slots 53 and simultaneously through aligned openings 83 of upper section 66. The upper end 92 of upper section 86 of rear support 11–13 is connected to rear connector bracket 56 in a similar manner with bolt 94. It is to be noted with particularity that bolt 94 permits pivotal movement of upper section 86 of the rear support member relative to the roof structure.

As shown in FIG. 5 lower section 67 of front support 8–11 is embedded in concrete 68 at a location, as best seen in FIG. 2, adjacent the front edge 69 of concrete slab 6. However, it is to be understood that the location of lower sections 67 can be varied to suit the particular needs of the installation. Care must be taken while embedding lower sections 67 in concrete 68 to assure that the axes of bores 70 are in a transverse plane passing through the axes of the several front supports. After the roof structure 7, front supports 8–10, and rear supports 11–13 are assembled, the lower end of upper section 66 of the front supports are inserted in the respective ones of lower sections 67. Bolts 82 are inserted through the appropriate openings 71–81 and through bore 70 of each front support to provide the desired height for the front of the roof structure.

The awning system is now in the folded position shown in FIG. 17 wherein the roof structure 7 hangs vertically from the upper ends of the front supports 8–10, rear supports 11–13 being folded within the roof section by pivoting about bolts 94. In the event of a storm with expected high winds bolts 85 may be tightened and if necessary a rope passed around the folded structure of FIG. 17 to secure roof structure 7 against swinging about bolts 85.

The first step in adapting the awning to a mobile home is to position the mobile home on supporting slabs 5 and 6 so that wheel 4 is on slab 5 and wheel 3 is as close to edge 6' of slab 6 as is convenient. In practice slab 5 is approximately three feet in width and slab 6 may be ten to fifteen feet in width depending on the design of the trailer park in which the mobile home is used. In the arrangement shown in FIGS. 1 and 2 the distance between the inner edges of slabs 5 and 6 is approximately five feet. By virtue of the adjustable feature of the awning system the awning can accommodate trailers eight feet, ten feet or 12 feet in width with equal facility. Such adjustment is possible by virtue of the elongated slots 53 by which the upper end of front supports 8–10 are connected to the roof section. By loosening bolts 85 it is a relatively easy matter to slide the roof section laterally toward or away from the mobile home within the limits of the length of slots 53. In practice, a length of about two feet for slots 53 is found desirable.

During such adjustment the rear support members 11–13 are moved with the roof structure but are maintained generally vertical so that bearing plates 91 rest against the top surface of concrete slab 6 to support the rear of the roof section. Hence, depending on the width of the mobile home, roof section 7 is conveniently moved laterally away from or toward edge 6' of the concrete slab to permit abutting the rear edge of the roof structure against a side wall 16 of the mobile home, regardless of the width of the mobile home or its precise parked position on concrete slabs 5 and 6. As shown in FIG. 2 in dotted line roof section 7 is moved laterally away from edge 6', when a wider mobile home 2 having a side wall 16' which extends further onto slab 6 than side wall 16, is parked at the desired location.

Prior to inserting upper section 86 of each rear support, in lower section 87, sleeve 96 is slipped onto each of upper section 86. When the front and rear supports are properly positioned and vertically adjusted, and the lateral position of roof section 7 is properly adjusted, the rear edge of the roof section is closely adjacent the side wall of the mobile home. As shown in FIG. 11 an elongated strip of rubber or other resilient material forms a sealing member 130 disposed between the vertical leg of rear member 24 and the surface of wall 16 to prevent leakage of rain water between the roof section and the wall.

With the rear supports in the position of FIG. 2 the several mounting brackets 14 may be adjusted and connected to frame member 15 of the mobile home. After chassis mounting bracket 116 is connected to frame member 15 the bar assembly comprised of links 100 and 113 is adjusted to proper length by overlapping the links the desired distance and the links are then connected together with bolts 111 and 112 shown in FIGS. 6 and 7. Stud 115 is then passed through the desired one of openings 125 to dispose sleeve 96 at the proper elevation so that links 100 and 113 clear the understructure of the mobile home. After these connections are made nut 115' is tightened to draw the rear support member toward side wall 16 of the mobile home. When the lower end of the rear support is closely adjacent the side wall bolt 104 is turned in a clockwise direction to cause its end 105 to bear against face 106 thereby pivoting the rear support member in a clockwise direction to cause the member to pivot around bolt 103' and thus swing the upper end of the rear support member toward wall 16 and to correspondingly move the roof section in the same direction to compress sealing member 130. In this manner a rigid secured connection is effected which compresses the gasket to sealing engagement between the rear edge of the roof section and the surface of wall 16 of the mobile home.

Since the sealing member is of a rubbery material there is little if any possibility of sliding movement between the rear edge of the roof structure. Hence, the roof structure is securely held against movement relative to wall 16 without resorting to a mechanical connection which would require drilling of or otherwise defacing the wall of the mobile home. Without the sealing member 130, rear supports 11–13 would have to be much stronger, and hence, more expensive, to resist swaying of the rear of the roof in heavy winds. Since the lower end of each rear support is rigidly held by a mounting bracket 14, it is to be appreciated that this lower end connection cooperates with the non-slip upper connection provided by the sealing member 130, to substantially fix the roof in position against the wall 16 of the mobile home. A seal is also provided between the roof structure at the wall to prevent rain leakage.

Since the rear supports 11–13 are each spaced apart the same distance of about five feet, one from the other, constructions of mobile homes will be encountered in which a wheel is located where it is desired to place a mounting bracket 14. In such instances the modified chassis mounting bracket of FIGS. 15 and 16 is used. As shown in FIG. 15 the modified mounting bracket assembly 116' includes connector clamps 131 and 132, each substantially identical to previously discussed connector clamp 116. Connector clamp 131 has a bolt 133 to secure clamp 131 to frame member 15. Clamp 132 has a bolt 134 to secure clamp 132 to frame member 15. Projecting perpendicularly from and connected to vertical face 135 of connector 131 is an angle iron member 136, member 136 having one leg horizontal and the other leg projecting vertically upwardly as best seen in FIGS. 15 and 16. Secured to and projecting perpendicularly from vertical face 137 of clamp 132 is a threaded bar 138 coplanar with and parallel to member 136. An angle iron cross member 139 having a short horizontally extending leg 140, and one end of an elongated upwardly extending vertical leg 141 is secured to end 142 of member 136 and is provided with horizontally spaced drilled openings 143 adjacent its other end to receive threaded bar 138. Note that openings 143 are spaced apart one from the other in substantially a straight line to permit varying the distance between clamps 131 and 132 by inserting bar 138 through a selected one of the openings. Adjacent its center cross member 140 is provided with a first row of drilled openings 144 and a second row of drilled openings 145. The rows of openings 144 and 145 are parallel to each other and corresponding openings of each row are in precise vertical alignment.

Disposed with its long dimension vertical is a connector plate 146 comprised of an angle iron having a wide leg 147 and a short leg 148 for rigidity. Formed in leg 147 are a plurality of vertically spaced openings 149. The distance between openings 149 is the same as the vertical distance between rows of openings 144 and 145. This permits attaching connector plate 146 at several vertical and horizontal positions on cross member 139 using bolt and nut assemblies 150 and 151. As shown in FIG. 16, the mounting arrangement for the bracket is such that inserting stud 115 through one of openings 149 in plate 147 provides the desired height for the bell crank and sleeve assembly of FIG. 7. If it is desired to have stud 115 at a higher or lower elevation to compensate for the structure of the trailer, such adjustment is easily accomplished by raising or lowering plate 146 relative to cross member 139. It is to be noted that links 113 and 100 of FIG. 15 are identical to these corresponding members in FIGS. 6 and 7. Hence, it is to be appreciated that only the connector assembly 116' need be different when a wheel interferes with the normal connector assembly 116. Hence, modified mounting bracket assembly 116' provides a structure which is shiftable along frame member 15 within predetermined limits to secure a rear support member regardless of the position of the rear support member relative to a wheel 3. It is to be noted that the distance between member 136 and bar 138 is sufficient to permit sliding clamps 131 and 132 in unison along frame 15 within predetermined limits to permit connecting stud 115 regardless of the position of the rear support relative to wheel 3.

Although a preferred embodiment has been shown and described in the environment of a trailer park where mobile homes are parked during use, it is to be understood that the awning system is also particularly adapted for use by individuals who have their own parking sites for mobile homes, and that such use falls within the scope of this invention. It is also to be understood that numerous changes and variations may be made in the embodiment shown and described without departing from the scope of this invention as defined in the appended claims.

What is claimed is:

1. An awning system for a mobile home comprising in combination;
    a roof structure;
    first support means connected to and supporting said roof structure adjacent one side thereof,
    said first means being rigidly secured to a support;
    second support means connected to and supporting said roof structure adjacent the side opposite said one side;
    said roof structure being adjustably secured relative to said first support means;
    said opposite side of said roof structure presenting a face engageable with a surface of a mobile home adapted to be positioned at a predetermined approximate position relative to said first support means; and
    mounting bracket means connected to said second support means for securing said second support means to the chassis of the mobile home.

2. An awning system in accordance with claim 1 in which;
    said first support means is comprised of a plurality of generally vertical, elongated first support members;
    said second support means is comprised of a plurality of elongated generally vertical second support members;
    said first support members being connected to said roof structure adjacent their top ends, and being secured to said support adjacent their bottom ends;
    said second support members being connected to said roof structure adjacent their top ends, and having their bottom ends in engagement with a supporting surface; and
    said bracket means extends transversely from said second support means in a direction away from said first support means.

3. An awning system in accordance with claim 1 which further includes
    sealing means between said face of said opposite side of said roof structure and said surface of said mobile home, said sealing means being effective to prevent leaking between said opposite side of said roof structure and said surface of said mobile home.

4. An awning system in accordance with claim 1 in which;
    said first and second support means are each pivotally connected to said roof structure to permit folding said roof structure to a non-use position.

5. An awning system in accordance with claim 1 in which;
    said first and second support means are each vertically adjustable.

6. An awning system in accordance with claim 1 in which;
    said first support means is comprised of a plurality of elongated vertical support members;
    said roof structure includes a plurality of connecting members each having a vertical slot extending transversely of said roof structure from adjacent said one side of said roof structure; and
    said vertical support members are connectable to said connecting members at any position along the length of said slot.

7. An awning system in accordance with claim 1 in which;
    said mounting bracket means projects generally horizontally from said second support means, and;
    said mounting bracket means is both horizontally and vertically adjustable to permit securing same to chassis of mobile homes of different models and make.

8. An awning system in accordance with claim 7 in which;
    said mounting bracket means further includes a U-shaped structure to extend on opposite sides of a wheel of said mobile home, when said wheel is located in the normal position of said bracket means.

9. An awning system in accordance with claim 7 in which;
    said bracket means further includes a manually operable device to pull said second support means toward said wall portion of said mobile home;
    whereby, said roof structure is drawn into engagement with said surface of said mobile home by operation of said manual means.

10. An awning system for the patio of a mobile home comprising, in combination;
    a roof structure;
    a plurality of upright horizontally spaced front supports for supporting the front of said roof structure;
    a plurality of upright horizontally spaced rear supports for supporting the rear of said roof structure;
    said roof structure presenting a face engageable with a cooperating surface of a mobile home adapted to be positioned at a predetermined approximate location relative to said front supports, said face being adjacent said rear supports;
    a plurality of front connector brackets each connected between said roof structure and a different one of said front supports adjacent the upper ends thereof;
    a plurality of rear connector brackets each including:
        first connecting means to connect said rear bracket to said roof structure, and second connecting means to pivotally connect the upper end of said rear supports to said rear bracket for pivotal movement transversely of said roof structure;

mounting bracket means connected between the mobile home and said rear supports at a location remote from the said upper ends thereof to secure said rear supports;

said mounting bracket means including a manually actuatable mechanism to pivot said rear supports so their upper ends move toward the mobile home to move said face of said roof structure into engagement with the cooperating surface of the mobile home, and to maintain same in firm engagement with each other, whereby said roof structure is restrained against movement relative to said mobile home.

11. An awning system in accordance with claim 10 in which
said front supports are each secured to the ground adjacent the lower ends thereof.

12. An awning system in accordance with claim 10 in which
said rear supports freely rest on the surface of the ground for movement relative thereto.

13. An awning system in accordance with claim 10 in which
each of said plurality of front and rear supports is vertically adjustable to adjust the height of said roof relative to the mobile home.

14. An awning system in accordance with claim 10 in which
said roof structure is comprised of a plurality of identical fabricated sections, and
each adjacent pair of sections is secured together with:
a common one of said front connector brackets, and
a common one of said rear connector brackets.

15. An awning system in accordance with claim 10 in which
said face of said roof structure is the surface of an elastic sealing member,
said sealing member being deformably engageable with the cooperating surface of the mobile home.

16. An awning system in accordance with claim 10 in which
said mounting bracket means includes a sleeve which extends around said rear support to connect same together for movement relative to each other.

17. An awning system in accordance with claim 10 in which
said manually actuatable mechanism of said mounting bracket means includes:
a bell crank secured to the trailer, and
a threaded force transmitting member.

18. An awning system in accordance with claim 10 in which
said mounting bracket means is vertically and horizontally adjustable, and is connected to a frame member of the chassis of the mobile home.

19. An awning system in accordance with claim 18 in which
said mounting bracket means further includes
adapter means to permit connecting the mounting bracket means to the chassis of the mobile home where a wheel of the mobile home interferes with the normal connection of said mounting bracket means.

References Cited by the Examiner

UNITED STATES PATENTS

| | | | |
|---|---|---|---|
| 2,618,820 | 11/1952 | Struben et al. | 52—90 XR |
| 2,701,397 | 2/1955 | Taylor | 52—90 X |
| 3,084,479 | 4/1963 | Struben | 52—90 X |
| 3,113,434 | 12/1963 | Phillips et al. | 52—90 X |

HARRISON R. MOSELEY, *Primary Examiner.*

P. C. KANNAN, *Assistant Examiner.*